US012570802B2

(12) United States Patent
Suzuki et al.

(10) Patent No.: US 12,570,802 B2
(45) Date of Patent: Mar. 10, 2026

(54) PERFLUOROPOLYETHER BLOCK-CONTAINING ORGANOHYDROGENPOLYSILOXANE, AND METHOD FOR PRODUCING SAME

(71) Applicant: Shin-Etsu Chemical Co., Ltd., Tokyo (JP)

(72) Inventors: Takayuki Suzuki, Annaka (JP); Tomoyuki Goto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 671 days.

(21) Appl. No.: 17/925,564

(22) PCT Filed: May 27, 2021

(86) PCT No.: PCT/JP2021/020121

§ 371 (c)(1),
(2) Date: Nov. 15, 2022

(87) PCT Pub. No.: WO2021/251151

PCT Pub. Date: Dec. 16, 2021

(65) Prior Publication Data

US 2023/0192961 A1 Jun. 22, 2023

(30) Foreign Application Priority Data

Jun. 11, 2020 (JP) ................................ 2020-101698

(51) Int. Cl.
*C08G 77/46* (2006.01)
*C08G 77/08* (2006.01)

(52) U.S. Cl.
CPC ............ *C08G 77/46* (2013.01); *C08G 77/08* (2013.01)

(58) Field of Classification Search
CPC ...... C08G 77/46; C08G 77/08; C08G 65/336; C08G 65/007; C08G 2650/48
See application file for complete search history.

(56) References Cited

U.S. PATENT DOCUMENTS

| | | | |
|---|---|---|---|
| 7,488,839 B2 | 2/2009 | Yamaguchi et al. | |
| 7,829,649 B2 | 11/2010 | Yamane et al. | |
| 8,022,161 B2 | 9/2011 | Yamane et al. | |
| 2007/0191554 A1 | 8/2007 | Yamaguchi et al. | |
| 2008/0293859 A1 | 11/2008 | Yamaguchi et al. | |
| 2009/0258986 A1 | 10/2009 | Yamaguchi et al. | |
| 2011/0218284 A1 | 9/2011 | Yamaguchi et al. | |
| 2012/0123049 A1 | 5/2012 | Koshikawa et al. | |
| 2016/0145433 A1* | 5/2016 | Corveleyn ........... | C08G 65/332 525/446 |
| 2016/0222170 A1 | 8/2016 | Muto et al. | |

FOREIGN PATENT DOCUMENTS

| | | | |
|---|---|---|---|
| EP | 2192144 | * | 2/2010 |
| JP | 2007-238928 | A | 9/2007 |
| JP | 2008-308628 | A | 12/2008 |
| JP | 2009-215358 | A | 9/2009 |
| JP | 2011-21158 | A | 2/2011 |
| JP | 2012-1652 | A | 1/2012 |
| JP | 2012-214649 | A | 11/2012 |
| JP | 2017-218513 | A | 12/2017 |
| JP | 2019-52228 | A | 4/2019 |

OTHER PUBLICATIONS

International Search Report for PCT/JP2021/020121 (PCT/ISA/210) mailed on Jun. 29, 2021.
Written Opinion of the International Searching Authority for PCT/JP2021/020121 (PCT/ISA/237) mailed on Jun. 29, 2021.

* cited by examiner

*Primary Examiner* — Heidi R Kelley
*Assistant Examiner* — Adam J Berro
(74) *Attorney, Agent, or Firm* — Birch, Stewart, Kolasch & Birch, LLP

(57) ABSTRACT

Provided is a perfluoropolyether block-containing organohydrogenpolysiloxane that is superior in compatibility with organopolysiloxanes, has an organohydrogensiloxy unit capable of being subjected to a hydrosilylation reaction with alkenyl groups, and allows the organohydrogensiloxy unit and siloxane contents thereof to be easily controlled. The invention is a perfluoropolyether block-containing organohydrogenpolysiloxane represented by the following formula (1)

[Chemical formula 1]

$$W2—Q—Rf—Q—(W1—Q—Rf—Q)_g—W2 \quad (1)$$

wherein, Rf is a perfluoropolyether block, W1 is independently a divalent organopolysiloxane block, W2 is independently a monovalent organopolysiloxane block, the numbers of the hydrogensiloxane units in W1 and W2 shall not both be 0 at the same time, Q is a divalent linking group that may contain at least one of oxygen atom and nitrogen atom, g is a number of not smaller than 0.

8 Claims, No Drawings

PERFLUOROPOLYETHER BLOCK-CONTAINING ORGANOHYDROGENPOLYSILOXANE, AND METHOD FOR PRODUCING SAME

TECHNICAL FIELD

The present invention relates to an organohydrogenpolysiloxane that has perfluoropolyether blocks, has an organopolysiloxane moiety present at both ends of the molecular chain, and is superior in compatibility with organopolysiloxanes; and a method for producing the same.

BACKGROUND ART

In general, since a perfluoropolyether group-containing compound has an extremely low surface free energy, it possesses, for example, a chemical resistance, a lubricity, a mold releasability, and a water- and oil-repellent property. Taking advantage of such properties, the compound is industrially and widely used in lubricants for magnetic recording media; oil proof agents for precision apparatuses; mold release agents; water- and oil-repellent antifoulants for paper, fiber, glass and resin; cosmetic materials; and protective films.

However, the low surface free energy of a perfluoropolyether group-containing compound indicates an extremely low compatibility and affinity to other substances. Problems in dispersion stability and others will occur if adding a perfluoropolyether group-containing compound to various industrial materials or the like for the purpose of imparting the above properties. It has thus been pointed out that it is difficult to add a perfluoropolyether group-containing compound to various industrial materials or the like.

Meanwhile, since a polysiloxane compound also has a low surface free energy, it possesses properties such as a water-repellent property, a lubricity and a mold releasability. However, a polysiloxane compound has a favorable affinity for other substances as compared to a perfluoropolyether compound, and is also capable of improving dispersion stability if modified variously. Thus, a polysiloxane compound can easily impart properties of a silicone when added to various industrial materials or the like; polysiloxane compounds are used as additives for performance upgrade in a wide range of fields. As a perfluoropolyether group- and polysiloxane chain-containing compound, there are perfluoropolyether-modified polysiloxane compounds (Patent documents 1 to 4).

However, if raising the fluorine modification rate for the purpose of improving the property of the perfluoropolyether group, an affinity for other industrial materials will be significantly impaired, and problems in dispersion stability and others may occur. In this regard, there have been made available perfluoropolyether-organopolysiloxane block copolymers each having the properties of both a perfluoropolyether and a polysiloxane, and having an excellent affinity for other industrial materials (Patent documents 5 and 6).

PRIOR ART DOCUMENTS

Patent Documents

Patent document 1: JP-A-2006-321764
Patent document 2: JP-A-2008-308628
Patent document 3: JP-A-2008-88412
Patent document 4: JP-A-2009-215358
Patent document 5: JP-A-2009-132826
Patent document 6: JP-A-2011-21158

SUMMARY OF THE INVENTION

Problems to be Solved by the Invention

The perfluoropolyether-organopolysiloxane block copolymers disclosed in Patent documents 5 and 6 also have a favorable affinity for organopolysiloxanes; however, since they do not have a hydrosilyl group, crosslinking cannot be established by a hydrosilylation reaction with an alkenyl group-containing organopolysiloxane, which makes it impossible to obtain a perfluoropolyether group-containing silicone elastomer.

Further, in the case of the perfluoropolyether group-containing organohydrogenpolysiloxane described in Patent document 4, since it has a small siloxane content in the molecule, a poor compatibility to organopolysiloxanes is exhibited, whereby an inhomogeneous and/or white turbid parts may occur in a cured product obtained by a hydrosilylation reaction with an alkenyl group-containing organopolysiloxane, which may impose negative impacts on optical properties. Further, since it is difficult to control the organohydrogensiloxy unit content impacting the mechanical properties of the cured product, it is likewise difficult to control the mechanical properties of the cured product obtained.

Thus, it is an object of the present invention to provide a perfluoropolyether block-containing organohydrogenpolysiloxane that is superior in compatibility with organopolysiloxanes while having perfluoropolyether groups, has an organohydrogensiloxy unit capable of being subjected to a hydrosilylation reaction with alkenyl groups, and allows the organohydrogensiloxy unit and siloxane unit contents thereof to be easily controlled; and a method for producing the same.

Means to Solve the Problems

That is, the present invention is as follows.

[1]

A perfluoropolyether block-containing organohydrogenpolysiloxane represented by the following formula (1)

[Chemical formula 1]

$$W2—Q—Rf—Q—(W1—Q—Rf—Q)_g—W2 \quad (1)$$

wherein in the formula (1), Rf is a perfluoropolyether block represented by a formula (2), W1 is independently a divalent organopolysiloxane block represented by a formula (A), W2 is independently a monovalent organopolysiloxane block represented by a formula (B), Q is a divalent linking group that may contain at least one of oxygen atom and nitrogen atom, g is a number of not smaller than 0, the formula (2) being expressed as

[Chemical formula 2]

$$—C_zF_{2z}(OCF_2)_v(OC_2F_4)_w(OC_3F_6)_x(OC_4F_8)_yOC_zF_{2z}— \quad (2)$$

wherein in the formula (2), z is an integer of 1 to 4; v, w, x and y each represent a number of 0 to 200, provided that v+w+x+y=3 to 200; each repeating unit may be linear or branched, there are no restrictions on an arrangement of each repeating unit, and the arrangement may be random or block, the formula (A) being expressed as

[Chemical formula 3]

(A)

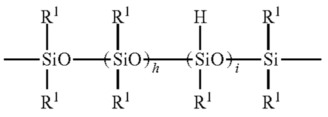

wherein in the formula (A), $R^1$ independently represents an alkyl group having 1 to 4 carbon atoms or a phenyl group; h and i each independently represent a number of 0 to 1,000; there are no restrictions on an arrangement of each repeating unit, and the arrangement may be random or block, and the formula (B) being expressed as

[Chemical formula 4]

(B)

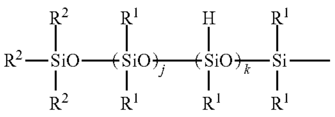

wherein in the formula (B), $R^1$ independently represents an alkyl group having 1 to 4 carbon atoms or a phenyl group; $R^2$ independently represents a hydrogen atom or an aliphatic unsaturated bond-free substituted or unsubstituted monovalent hydrocarbon group having 1 to 18 carbon atoms; j and k each independently represent a number of 0 to 1,000; there are no restrictions on an arrangement of each repeating unit, and the arrangement may be random or block, and wherein the number i of the hydrogensiloxane units in the formula (A) and the number k of the hydrogensiloxane units in the formula (B) shall not both be 0 at the same time; and Q in the formula (1) is bonded to any of the terminal carbon atom of Rf, the terminal silicon atom of W1, or the terminal silicon atom of W2.

[2]

The perfluoropolyether block-containing organohydrogenpolysiloxane according to [1], wherein the organohydrogenpolysiloxane has a number average molecular weight of 2,000 to 500,000, and an organopolysiloxane content of not smaller than 35% per molecule.

[3]

The perfluoropolyether block-containing organohydrogenpolysiloxane according to [1] or [2], wherein the perfluoropolyether block represented by Rf is a group expressed by the following formula (10)

[Chemical formula 5]

$$-CF_2(OCF_2)_v(OC_2F_4)_wOCF_2- \quad (10)$$

wherein in the formula (10), v and w each represent a number of 0 to 200, provided that v+w=3 to 200; the repeating unit of $(OC_2F_4)$ may be linear or branched; there are no restrictions on an arrangement of each repeating unit, and the arrangement may be random or block.

[4]

A method for producing a perfluoropolyether block-containing organohydrogenpolysiloxane represented by a formula (1), comprising an exchange reaction step of mixing:

(a) a perfluoropolyether-organopolysiloxane block copolymer represented by a formula (11);

(b) an organohydrogenpolysiloxane; and (c) an acid catalyst so as to cause an exchange reaction between the siloxanes of (a) and (b), the formula (11) being expressed as

[Chemical formula 6]

$$W4-Q-Rf-Q\left(W3-Q-Rf-Q\right)_e W4 \quad (11)$$

wherein in the formula (11), Rf is a perfluoropolyether block represented by a formula (2), W3 is independently a divalent organopolysiloxane block represented by a formula (C), W4 is independently a monovalent organopolysiloxane block represented by a formula (D), Q is a divalent linking group that may contain at least one of oxygen atom and nitrogen atom, e is a number of not smaller than 0, the formula (2) being expressed as

[Chemical formula 7]

$$-C_zF_{2z}(OCF_2)_v(OC_2F_4)_w(OC_3F_6)_x(OC_4F_8)_yOC_zF_{2z}- \quad (2)$$

wherein in the formula (2), z is an integer of 1 to 4; v, w, x and y each represent a number of 0 to 200, provided that v+w+x+y=3 to 200; each repeating unit may be linear or branched, there are no restrictions on an arrangement of each repeating unit, and the arrangement may be random or block, the formula (C) being expressed as

[Chemical formula 8]

(C)

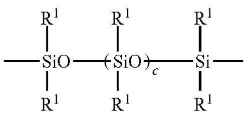

wherein in the formula (C), $R^1$ independently represents an alkyl group having 1 to 4 carbon atoms or a phenyl group; c independently represents a number of 0 to 1,000, and the formula (D) being expressed as

[Chemical formula 9]

(D)

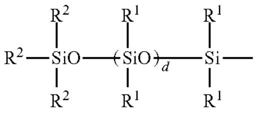

wherein in the formula (D), $R^1$ independently represents an alkyl group having 1 to 4 carbon atoms or a phenyl group; $R^2$ independently represents a hydrogen atom or an aliphatic unsaturated bond-free substituted or unsubstituted monovalent hydrocarbon group having 1 to 18 carbon atoms; d independently represents a number of 0 to 1,000, and wherein Q in the formula (11) is bonded to any of the terminal carbon atom of Rf, the terminal silicon atom of W3, or the terminal silicon atom of W4, the formula (1) being expressed as

[Chemical formula 10]

$$W2—Q—Rf—Q—(W1—Q—Rf—Q)_g—W2 \quad (1)$$

wherein in the formula (1), Rf is a perfluoropolyether block represented by a formula (2), W1 is independently a divalent organopolysiloxane block represented by a formula (A), W2 is independently a monovalent organopolysiloxane block represented by a formula (B), Q is a divalent linking group that may contain at least one of oxygen atom and nitrogen atom, g is a number of not smaller than 0, the formula (2) being expressed as

[Chemical formula 11]

$$—C_zF_{2z}(OCF_2)_v(OC_2F_4)_w(OC_3F_6)_x(OC_4F_8)_yOC_zF_{2z}— \quad (2)$$

wherein in the formula (2), z is an integer of 1 to 4; v, w, x and y each represent a number of 0 to 200, provided that v+w+x+y=3 to 200; each repeating unit may be linear or branched, there are no restrictions on an arrangement of each repeating unit, and the arrangement may be random or block, the formula (A) being expressed as

[Chemical formula 12]

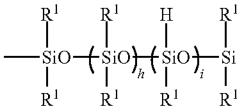

(A)

wherein in the formula (A), $R^1$ independently represents an alkyl group having 1 to 4 carbon atoms or a phenyl group; h and i each independently represent a number of 0 to 1,000; there are no restrictions on an arrangement of each repeating unit, and the arrangement may be random or block, and the formula (B) being expressed as

[Chemical formula 13]

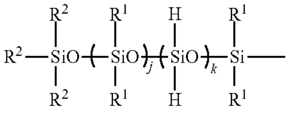

(B)

wherein in the formula (B), $R^1$ independently represents an alkyl group having 1 to 4 carbon atoms or a phenyl group; $R^2$ independently represents a hydrogen atom or an aliphatic unsaturated bond-free substituted or unsubstituted monovalent hydrocarbon group having 1 to 18 carbon atoms; j and k each independently represent a number of 0 to 1,000; there are no restrictions on an arrangement of each repeating unit, and the arrangement may be random or block, and wherein the number i of the hydrogensiloxane units in the formula (A) and the number k of the hydrogensiloxane units in the formula (B) shall not both be 0 at the same time; and Q in the formula (1) is bonded to any of the terminal carbon atom of Rf, the terminal silicon atom of W1, or the terminal silicon atom of W2.

[5]

The method for producing the perfluoropolyether block-containing organohydrogenpolysiloxane according to [4], wherein the component (b) is at least one selected from 1,3,5,7-tetramethylcyclotetrasiloxane and 1,3,5,7,9-pentamethylcyclopentasiloxane.

[6]

The method for producing the perfluoropolyether block-containing organohydrogenpolysiloxane according to [4] or [5], wherein e is 0 in the formula (11).

[7]

The method for producing the perfluoropolyether block-containing organohydrogenpolysiloxane according to any one of [4] to [6], wherein the exchange reaction step is performed by further adding (d) an organohydrogensiloxy unit-free organopolysiloxane to the components (a), (b) and (c), and is a step of causing an exchange reaction between the siloxanes of (a), (b) and (d).

[8]

The method for producing the perfluoropolyether block-containing organohydrogenpolysiloxane according to any one of [4] to [7], wherein the acid catalyst (c) is at least one selected from sulfuric acid, methanesulfonic acid and trifluoromethanesulfonic acid.

Effects of the Invention

Since the organohydrogenpolysiloxane of the present invention has a high siloxane content and a siloxane block present at both ends of the molecular chain while having perfluoropolyether groups, the organohydrogenpolysiloxane is readily compatible with organopolysiloxanes, and an inhomogeneous and/or white turbid parts are less likely to occur in the cured product obtained as the organohydrogenpolysiloxane is capable of being subjected to hydrosilylation with an alkenyl group-containing organopolysiloxane.

Further, since the organohydrogenpolysiloxane of the present invention allows the organohydrogensiloxy unit content thereof to be easily controlled, the mechanical properties of the cured product can also be controlled.

MODE FOR CARRYING OUT THE INVENTION

An organohydrogenpolysiloxane of the present invention is represented by the following formula (1) wherein a perfluoropolyether block (Rf) and an organopolysiloxane block (W2 or W1) exist alternately.

[Chemical formula 14]

$$W2—Q—Rf—Q—(W1—Q—Rf—Q)_g—W2 \quad (1)$$

Since W2 or W1 has an organohydrogensiloxy unit(s), the organohydrogenpolysiloxane of the present invention that is represented by the formula (1) can be subjected to hydrosilylation with an alkenyl group-containing organopolysiloxane.

It is preferred that the organohydrogenpolysiloxane of the formula (1) contain, per molecule, 35 to 99%, more preferably 50 to 90% of organopolysiloxanes. It is preferable when the siloxane content is not less than the above lower limit and not more than the above upper limit. This is because when the siloxane content is not less than such lower limit, an excellent compatibility to organopolysiloxane will be exhibited; and when the siloxane content is not more than such upper limit, the properties of the perfluoropolyether groups will be easily expressed. Through a $^1$H-NMR spectrum of the organohydrogenpolysiloxane of the formula (1), the value of the siloxane content is calculated in such a manner that a molar ratio between the perfluoropolyether blocks Rf with known molecular weights and organosiloxy units is at first obtained from an integrated ratio between a peak derived from alkylene of Q in the formula (1) and a peak derived from an alkyl and/or phenyl group(s) bonded to the silicon atom, and this molar ratio is then converted into a molecular weight ratio. Here, since the organohydrogenpolysiloxane of the formula (1) has a distribution in its structure, the siloxane content is an average value per molecule.

At least one of the organopolysiloxane blocks W1 and W2 has an organohydrogensiloxy unit represented by the following formula (3).

[Chemical formula 15]

(3)

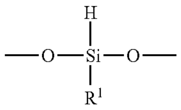

In the formula (3), $R^1$ represents an alkyl group having 1 to 4 carbon atoms or a phenyl group, of which a methyl group is preferred.

There is at least one, preferably at least three such organohydrogensiloxy units in the formula (1). Here, the groups of the formula (3) in the organopolysiloxane blocks W1 and W2 may differ from each other.

The divalent organopolysiloxane block W1 is a group represented by the following general formula (A).

[Chemical formula 16]

(A)

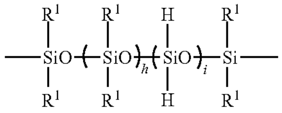

In the formula (A), each $R^1$ independently represents an alkyl group having 1 to 4 carbon atoms or a phenyl group, preferably a methyl group or a phenyl group. Each of h and i independently represents a number of 0 to 1,000, preferably a number of 0 to 500. Here, there are no restrictions on the arrangement of each repeating unit; it may be random or block.

Examples of the group represented by the formula (A) include groups represented by the following formulae (4) to (6). However, the group represented by the formula (A) shall not be limited to the groups represented by the following formulae.

[Chemical formulae 17]

(4)

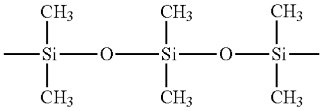

(5)

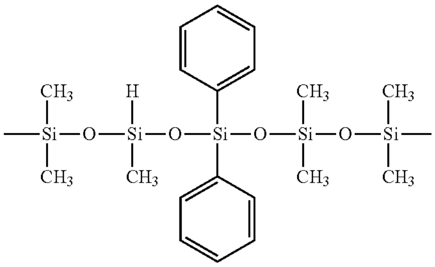

(6)

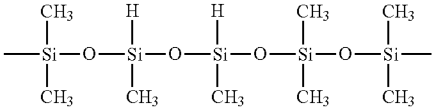

The monovalent organopolysiloxane block W2 is a group represented by the following general formula (B).

[Chemical formula 18]

(B)

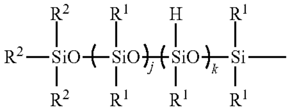

In the formula (B), each $R^1$ independently represents an alkyl group having 1 to 4 carbon atoms or a phenyl group, preferably a methyl group or a phenyl group. Each $R^2$ independently represents a hydrogen atom or an aliphatic unsaturated bond-free substituted or unsubstituted monovalent hydrocarbon group having 1 to 18 carbon atoms. $R^2$ is preferably an unsubstituted alkyl group having 1 to 18 carbon atoms; more preferably a methyl group, an n-butyl group, an n-hexyl group, an n-octyl group, an n-octadecyl group or a hydrogen atom; even more preferably a methyl group, an n-butyl group, an n-hexyl group or a hydrogen atom. Each of j and k independently represents a number of 0 to 1,000, preferably a number of 0 to 500. Here, the arrangement of each repeating unit may be random.

Further, the number i of the hydrogensiloxane units in the formula (A) and the number k of the hydrogensiloxane units in the formula (B) shall not both be 0 at the same time. That is, the organohydrogenpolysiloxane of the formula (1) is characterized by invariably having a silicon atom-bonded hydrogen atom(s) therein, and it is preferred that i and k satisfy i+k=2 to 200.

Examples of the group represented by the formula (B) include groups represented by the following formulae (7) to (9). However, the group represented by the formula (B) shall not be limited to the groups represented by the following formulae.

[Chemical formulae 19]

(7)

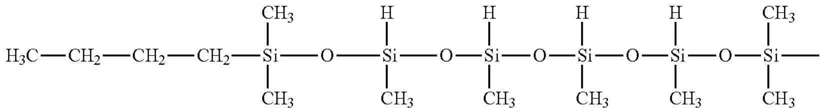

(8)

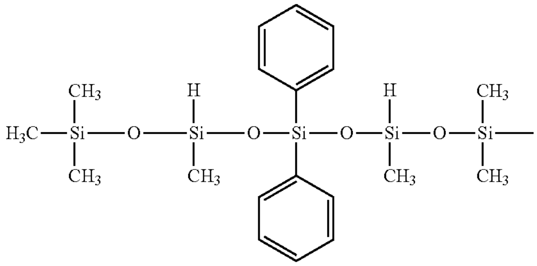

(9)

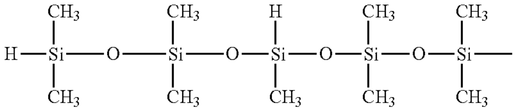

The perfluoropolyether block (Rf) is a block in which multiple repeating units each represented by the following general formula are bonded together.

$—C_rF_{2r}O—$

Here, r is an integer of not smaller than 1, preferably an integer of 1 to 4.

The perfluoropolyether block may be that in which two or more kinds of these repeating units are bonded together, and is represented by the following general formula (2).

[Chemical formula 20]

$$—C_zF_{2z}(OCF_2)_v(OC_2F_4)_w(OC_3F_6)_x(OC_4F_8)_yOC_zF_{2z}— \quad (2)$$

In the formula (2), z is an integer of 1 to 4; v, w, x and y each represent a number of 0 to 200, preferably a number of 0 to 50, provided that v+w+x+y=3 to 200, preferably 10 to 50. Each repeating unit may be linear or branched, and the repeating units may be bonded to one another randomly.

Examples of each repeating unit in the perfluoropolyether block represented by the formula (2) may include the following repeating units.

$—CF_2O—$ $—CF_2CF_2O—$ $—CF_2CF_2CF_2O—$ $—CF(CF_3)CF_2O—$ $—CF_2CF_2CF_2CF_2O—$ $—C(CF_3)_2O—$

Preferred is a perfluoropolyether block of the following formula (10) where z=1, and x and y each represent 0 in the formula (2), as such perfluoropolyether block is superior in compatibility with organopolysiloxane.

[Chemical formula 21]

$$—CF_2(OCF_2)_v(OC_2F_4)_wOCF_2— \quad (10)$$

(In this formula, v and w each represent a number of 0 to 200, preferably a number of 0 to 50, provided that v+w=3 to 200, preferably 10 to 50; the repeating unit of $(OC_2F_4)$ may be linear or branched, and the repeating units may be bonded to one another randomly.)

The perfluoropolyether blocks represented by the above formulae normally have distributions in their structures, and v, w, x and y are each an average value per molecule.

In the formula (1), Q is characterized by being a divalent linking group that may contain at least one of oxygen atom and nitrogen atom, and it is preferred that such linking group have 2 to 12 carbon atoms. An oxygen atom-containing group may for example be an ether group and an ester group; and a nitrogen atom-containing group may for example be an amino group and an amide group. Examples of Q may include the following groups.

[Chemical formulae 22]

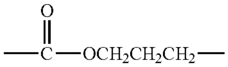

$—CH_2OCH_2CH_2CH_2—$ $—CF_2OCH_2CH_2CH_2—$

$—(CH_2)_f—$ (f is an integer of 2 to 4)

Here, $—CH_2OCH_2CH_2CH_2—$ is particularly preferred in terms of ease in linking the organopolysiloxane block and the perfluoropolyether block.

It is preferred that the number average molecular weight of the organohydrogenpolysiloxane of the formula (1) be 2,000 to 500,000. When the number average molecular weight is a number within these ranges, an excellent solubility in organopolysiloxane will be exhibited, and handling tends to be easy as well. Here, in the present invention, the number average molecular weight is a value in terms of polystyrene that is measured by GPC (gel permeation chromatography) using toluene as a developing solvent (the same hereinafter).

[Measurement Conditions]

Developing solvent: Toluene

Flow rate: 0.6 mL/min

Detector: Differential refractive index detector (RI)

Column: TSK Guardcolumn Super H-H

TSK gel Super H5000 (6.0 mm I.D.×15 cm×1)

TSK gel Super H4000 (6.0 mm I.D.×15 cm×1)

TSK gel Super H3000 (6.0 mm I.D.×15 cm×1)

TSK gel Super H2000 (6.0 mm I.D.×15 cm×1)

(All manufactured by Tosoh Corporation)

Column temperature: 40° C.

Sample injection volume: 50 μL (Toluene solution with a concentration of 0.3% by weight)

In the formula (1), g is a number of not smaller than 0, preferably a number at which the number average molecular weight of the organohydrogenpolysiloxane of the formula (1) will be 2,000 to 500,000. Specifically, it is preferred that g be a number of 0 to 100, more preferably a number of 0 to 50.

The present invention also relates to a method for producing the above perfluoropolyether block-containing organohydrogenpolysiloxane. The organohydrogenpolysiloxane of the present invention can be produced by the method described below.

Here, (a) a perfluoropolyether-organopolysiloxane block copolymer represented by a formula (11), (b) an organohydrogenpolysiloxane and (c) an acid catalyst are to be mixed together whereby an exchange reaction between the siloxanes of (a) and (b) will take place so as to allow there to be obtained the organohydrogenpolysiloxane represented by the formula (1).

The perfluoropolyether-organopolysiloxane block copolymer (a) represented by the formula (11) can be produced by, for example, a method described in Japanese Patent No. 4,900,854.

Specifically, hydrosilylated under the presence of a platinum catalyst are: at least one of an organohydrogenpolysiloxane that is used to induce W4 and has one hydrosilyl group at one end thereof, and an organohydrogenpolysiloxane that is used to induce W3 and/or W4 and has one hydrosilyl group at both ends thereof, and a compound represented by the following formula (12) wherein an unsaturated group-containing group Q' is present on both sides of Rf

[Chemical formulae 23]

$$W4—Q—Rf—Q\!\left(W3—Q—Rf—Q\right)_e W4 \qquad (11)$$

$$Q'—Rf—Q' \qquad (12)$$

In the formula (11), Rf is the perfluoropolyether block represented by the formula (2); e is a number of not smaller than 0, preferably 0.

In the formula (12), Q' may for example be any of the following unsaturated group-containing groups.

[Chemical formulae 24]

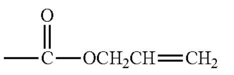

$—CH_2OCH_2CH{=}CH_2$ $—CF_2OCH_2CH{=}CH_2$

-continued

$—C_fH_{2f-1}$ (f is an integer of 2 to 4)

In the formula (11), each W3 independently represents a divalent organopolysiloxane block expressed by the following formula (C).

[Chemical formula 25]

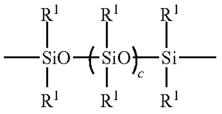

(C)

In the formula (C), each $R^1$ independently represents an alkyl group having 1 to 4 carbon atoms or a phenyl group, preferably a methyl group or a phenyl group. Each c independently represents a number of 0 to 1,000, preferably a number of 0 to 500.

In the formula (11), each W4 independently represents a monovalent organopolysiloxane block expressed by the following formula (D).

[Chemical formula 26]

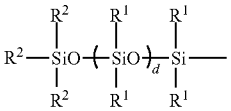

(D)

In the formula (D), each $R^1$ independently represents an alkyl group having 1 to 4 carbon atoms or a phenyl group, preferably a methyl group or a phenyl group; each $R^2$ independently represents a hydrogen atom or an aliphatic unsaturated bond-free substituted or unsubstituted monovalent hydrocarbon group having 1 to 18 carbon atoms, preferably a methyl group, an n-butyl group or a hydrogen atom, more preferably a methyl group or an n-butyl group. Each d independently represents a number of 0 to 1,000, preferably a number of 0 to 500.

As for the formula (11), the following siloxanes may for example serve as the examples of the organohydrogenpolysiloxane that is used to induce W4 and has one hydrosilyl group at one end thereof, the organohydrogenpolysiloxane shall not be limited to those expressed by the following formulae.

[Chemical formulae 27]

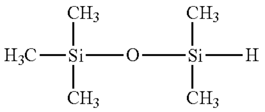

-continued

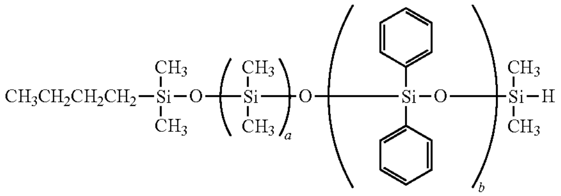

a = 0~1000
b = 0~500

(In these formulae, there are no restrictions on the arrangement of each repeating unit; it may be random or block.)

As for the formula (11), the following siloxanes may for example serve as the examples of the organohydrogenpolysiloxane that is used to induce W3 and/or W4 and has one hydrosilyl group at both ends thereof; the organohydrogenpolysiloxane shall not be limited to those expressed by the following formulae.

[Chemical formula 28]

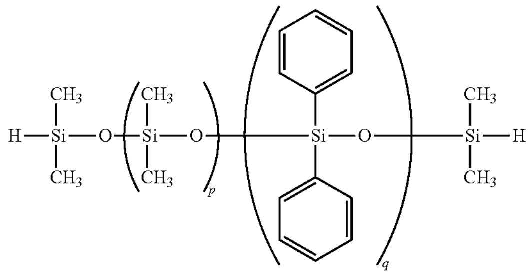

p = 0~1000
q = 0~500

(In these formulae, there are no restrictions on the arrangement of each repeating unit; it may be random or block.)

The organohydrogenpolysiloxane (b) may be linear, branched or cyclic, and may be exemplified by the following siloxanes.

[Chemical formulae 29]

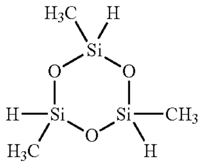

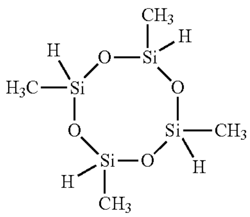

-continued

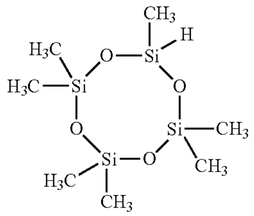

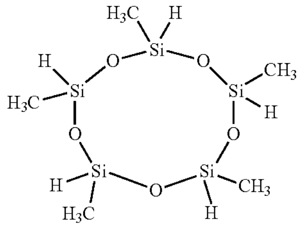

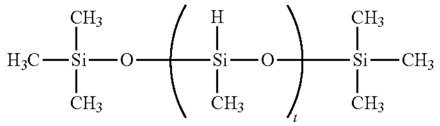

t = 1~500

Particularly, preferred are 1,3,5,7-tetramethylcyclotetrasiloxane and 1,3,5,7,9-pentamethylcyclopentasiloxane.

There are no particular restrictions on the acid catalyst (c) so long as it is capable of hydrolyzing the siloxane bonds of (a) and (b); for example, preferred are sulfuric acid, methanesulfonic acid and trifluoromethanesulfonic acid.

In the method for producing the organohydrogenpolysiloxane of the formula (1), if necessary, (d) an organohydrogensiloxy unit-free organopolysiloxane may be added to perform the exchange reaction between the siloxanes.

By adding (d) to perform the reaction, the content of the organohydrogensiloxy units in the formula (1) can be controlled, which makes it easy to control the mechanical properties of a cured product obtained by performing hydrosilylation with an alkenyl group-containing organopolysiloxane.

As the organohydrogensiloxy unit-free organopolysiloxane (d), there may be listed, for example, a cyclic siloxane represented by the following formula (13) and a linear siloxane represented by the following formula (14).

[Chemical formula 30]

(13)

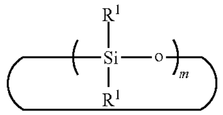

(In the formula (13), each $R^1$ independently represents an alkyl group having 1 to 4 carbon atoms or a phenyl group, preferably a methyl group or a phenyl group. m is a number of 3 to 10, preferably a number of 4 to 8.)

[Chemical formula 31]

(14)

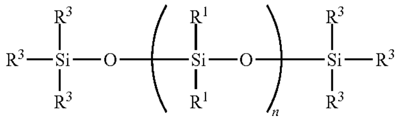

(In the formula (14), each $R^1$ independently represents an alkyl group having 1 to 4 carbon atoms or a phenyl group, preferably a methyl group or a phenyl group. Each $R^3$ independently represents an aliphatic unsaturated bond-free substituted or unsubstituted monovalent hydrocarbon group having 1 to 18 carbon atoms, preferably a methyl group. n is a number of 0 to 5,000, preferably a number of 2 to 1,000.)

Particularly, preferred are octamethylcyclotetrasiloxane, decamethylcyclopentasiloxane, and dodecamethylcyclohexasiloxane.

In the method for producing the organohydrogenpolysiloxane of the formula (1), (e) an organic solvent may be optionally added to perform the exchange reaction between the siloxanes. While such reaction can also take place without a solvent, by adding an organic solvent, the perfluoropolyether-organopolysiloxane block copolymer (a) and the polysiloxanes (b) and (d) will be more compatible with one another such that the exchange reaction between the siloxanes can progress efficiently.

Examples of the organic solvent (e) may include an aromatic hydrocarbon such as toluene and xylene; an aliphatic hydrocarbon such as pentane, hexane and heptane; ketones such as methylethylketone and diisopropylketone; alcohols such as 1-propanol, 2-propanol and 1-butanol; and a fluorinated aromatic hydrocarbon such as (trifluoromethyl) benzene and 1,3-bis(trifluoromethyl)benzene, of which 1,3-bis(trifluoromethyl)benzene is preferred as it has a favorable compatibility with the perfluoropolyether-organopolysiloxane block copolymer (a) represented by the formula (11) and the siloxane (d).

Since the organohydrogenpolysiloxane of the formula (1) that is obtained by the above production method normally has a distribution in its structure, g in the formula (1) is an average value per molecule.

WORKING EXAMPLES

The present invention is described in detail hereunder with reference to working and comparative examples; the present invention shall not be limited to the following working examples. Here, in the following examples, the number average molecular weight is a value in terms of polystyrene that is obtained by a GPC measurement performed under the above measurement conditions. Further, in the following examples, the repeating unit number g is a value calculated from an integrated value M derived from Si in a structure $Si(R^2)_3$—O— based on the formula (1), and an integrated value M' derived from Si in a structure -Q-Si $(R^1)_2$—O— based on the formula (1), where g, M and M' satisfy g=(M'/M)−1.

Working Example 1

Synthesis of Organohydrogenpolysiloxane (1-1)

Here, 12.6 g of a perfluoropolyether-organopolysiloxane block copolymer represented by the following formula (11-1) and synthesized according to Japanese Patent No. 4,900,854, 1 g of 1,3,5,7-tetramethylcyclotetrasiloxane and 14 g of 1,3-bis(trifluoromethyl)benzene were put into a reaction container to stir them at 25° C. for 5 min, followed by adding 37 mg of a trifluoromethanesulfonic acid thereto to then perform stirring at 25° C. for another 18 hours. Next, for the purpose of neutralizing the trifluoromethanesulfonic acid, 280 mg of KYOWAAD 500 (by Kyowa Chemical Industry Co., Ltd.) as an adsorbent was added to perform stirring at 25° C. for another 2 hours. A mixture thus obtained was then filtrated, followed by distilling away, under a reduced pressure, 1,3-bis(trifluoromethyl)benzene as a solvent and a low-molecular siloxane generated, thereby obtaining 11.1 g of a white semitransparent liquid product.

(11-1)

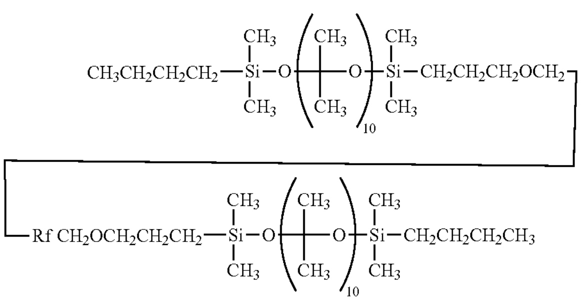

Rf: $—CF_2(OC_2F_4)_p(OCF_2)_qOCF_2—$ (In these formulae, p/q is 1.2, and p+q is 19.)

$^1$H-NMR signals of the organohydrogenpolysiloxane obtained are as follows.

$^1$H-NMR ($CDCl_3$, 400 MHz): δ ppm 0.07 (153H, m), 0.54 (9H, m), 0.89 (6H, t, J=6.8 Hz), 1.32 (8H, m), 1.62 (5H, m), 3.55 (5H, m), 3.77 (5H, m), 4.69 (4H, s).

The above results indicate that the organohydrogenpolysiloxane obtained has a structure expressed by the following formula (1-1), and that a siloxane content in the molecule is 52%. Further, the number average molecular weight thereof in terms of polystyrene was 3,300 when measured by GPC.

[Chemical formulae 33]

(1-1)

$$W2—Q—Rf—Q\left(W1—Q—Rf—Q\right)_g W2$$

(In this formula, g is 0.25.)

Rf: $—CF_2(OC_2F_4)_p(OCF_2)_qOCF_2—$ (In this formula, p/q is 1.2, and p+q is 19.)

W1: 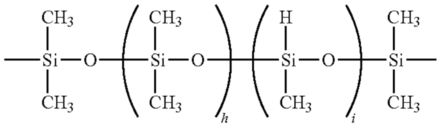

W2: 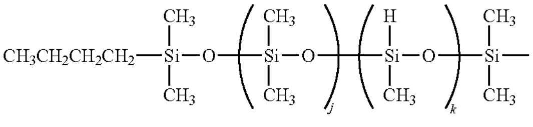

(In the formula (1-1), there are 4 organohydrogensiloxy units and 19 dimethylsiloxy units, where h, i, j and k in the formulae W1 and W2 are number satisfying these conditions.)

Q: $—CH_2OCH_2CH_2CH_2—$ (In the above formulae, Rf is bonded to the methylene group side of Q (the same hereinafter).)

Working Example 2

Synthesis of Organohydrogenpolysiloxane (1-2)

Here, 9.9 g of a perfluoropolyether-organopolysiloxane block copolymer represented by the following formula (11-2), 1.2 g of 1,3,5,7-tetramethylcyclotetrasiloxane, 3.0 g of octamethylcyclotetrasiloxane and 14 g of 1,3-bis(trifluoromethyl)benzene were put into a reaction container to stir them at 25° C. for 5 min, followed by adding 37 mg of a trifluoromethanesulfonic acid thereto to then perform stirring at 25° C. for another 18 hours. Next, for the purpose of neutralizing the trifluoromethanesulfonic acid, 280 mg of KYOWAAD 500 (by Kyowa Chemical Industry Co., Ltd.) as an adsorbent was added to perform stirring at 25° C. for another 2 hours. A mixture thus obtained was then filtrated, followed by distilling away, under a reduced pressure, 1,3-bis(trifluoromethyl)benzene as a solvent and a low-molecular siloxane generated, thereby obtaining 11.0 g of a white semitransparent liquid product.

[Chemical formulae 34]

(11-2)

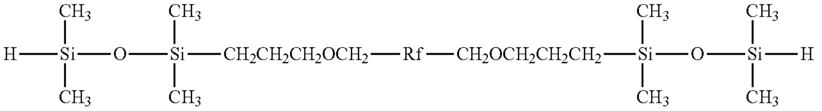

Rf: $—CF_2(OC_2F_4)_p(OCF_2)_qOCF_2—$ (In this formula, p/q is 1.2, and p+q is 19.)

$^1$H-NMR signals of the organohydrogenpolysiloxane obtained are as follows.

$^1$H-NMR ($CDCl_3$, 400 MHz): δ ppm 0.07 (90H, m), 0.54 (4H, m), 1.62 (4H, m), 3.55 (4H, m), 3.77 (4H, m), 4.69 (6H, s).

The above results indicate that the organohydrogenpolysiloxane obtained has a structure expressed by the following formula (1-2), and that a siloxane content in the molecule is 35%. Further, the number average molecular weight thereof in terms of polystyrene was 3,000 when measured by GPC.

[Chemical formulae 35]

$$W2—Q—Rf—Q\left(W1—Q—Rf—Q\right)_g W2 \quad (1\text{-}2)$$

(In this formula, g is 0.08.)

Rf: $—CF_2(OC_2F_4)_p(OCF_2)_qOCF_2—$ (In this formula, p/q is 1.2, and p+q is 19.)

W1: 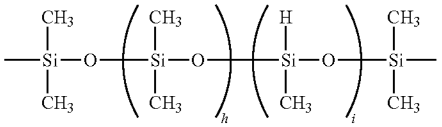

W2: 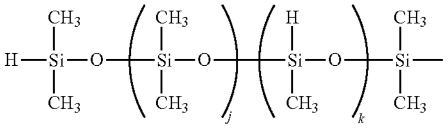

(In the formula (1-2), there are 6 organohydrogensiloxy units including those at molecular chain ends and 8 dimethylsiloxy units, per each perfluoropolyether block represented by R f; h, i, j and k in the formulae W1 and W2 are number satisfying these conditions.)

Q: $—CH_2OCH_2CH_2CH_2—$

Comparative Example 1 (Siloxane Content in Molecule: 20%)

[Chemical formulae 36]

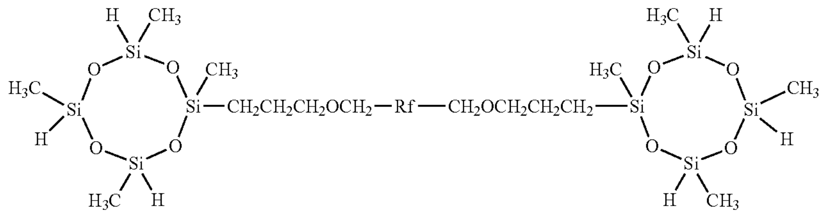

Rf: $—CF_2(OC_2F_4)_p(OCF_2)_qOCF_2—$ (In this formula, p/q is 1.2, and p+q is 19.)

Comparative Example 2 (Siloxane Content in Molecule: 36%)

[Chemical formulae 37]

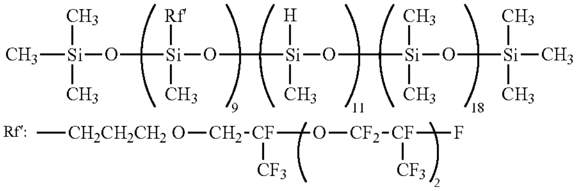

(In the above formulae, the arrangement of each repeating unit is random.)

Table 1 shows results of a solubility evaluation performed on the organohydrogenpolysiloxanes of the working and comparative examples.

[Evaluation on Solubility of Perfluoropolyether Block-Containing Organohydrogenpolysiloxane in Organopolysiloxane]

Here, 1 g of the organohydrogenpolysiloxane obtained by the above method was added to 10 g of an α, ω-divinylpolysiloxane represented by the following formula (g-1) before thoroughly stirring them and then visually observing the mixed liquid thereof, solubility was then evaluated based on the following criteria.

Evaluation Criteria

Category 0: Mixed liquid was separated into two phases.

Category 1: Mixed liquid was white semitransparent and homogeneous.

Category 2: Mixed liquid was colorless and transparent, and homogeneous.

[Chemical formula 38]

(g-1)

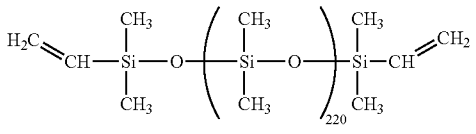

TABLE 1

| | Working example 1 | Working example 2 | Comparative example 1 | Comparative example 2 |
|---|---|---|---|---|
| Evaluation on solubility | 2 | 1 | 0 | 0 |

[Preparation of Silicone Elastomer Composition]

A silicone elastomer composition was prepared using the organohydrogenpolysiloxane obtained in each of the working and comparative examples.

As shown in Table 2, the composition was obtained by mixing components (f) to (h) and 1,1-dimethylpropynyloxytrimethylsilane as a reaction controller. Here, in Table 2, the unit of the amount of the component(s) contained in the composition is part by mass; H/Vi represents a molar ratio of the hydrosilyl groups in the composition to the alkenyl groups therein.

[Molding of Silicone Elastomer]

Each composition was put into a mold frame having a size of 15 cm×20 cm×2 mm. After the composition was sufficiently deaerated, a mold plate was then placed thereon so as to sandwich the composition before performing heating at 120° C. for two hours. A sheet-like silicone elastomer was thus obtained by crosslinking the organohydrogenpolysiloxane (f) and the vinylpolysiloxane (g) via a hydrosilylation reaction.

[Evaluation on Transparency of Silicone Elastomer]

Table 2 shows results obtained by visually observing the silicone elastomer obtained by the above method. Here, in Table 2, "A" represents a condition where the silicone elastomer was transparent; "B" represents a condition where turbidity was detected as a result of changing an angle of light irradiation; "C" represents a condition where there were an inhomogeneous and/or white turbid parts.

TABLE 2

| Component of composition (part by mass) | Reference example 1 | Reference example 2 | Comparative Reference example 1 | Comparative Reference example 2 |
|---|---|---|---|---|
| (f) Organohydrogenpolysiloxane | Working example 1 15.6 | Working example 2 8.4 | Comparative example 1 6.9 | Comparative example 2 11.1 |
| (g) Vinylpolysiloxane (g-1) | 83.6 | 90.8 | 92.3 | 88.1 |
| (h) Complex of platinum and vinylsiloxane (Platinum atom 0.5% by mass) | 0.5 | 0.5 | 0.5 | 0.5 |
| Reaction controller 1,1-dimethylpropynyloxytrimethylsilane | 0.3 | 0.3 | 0.3 | 0.3 |
| H/Vi | 1.5 | 1.5 | 1.5 | 1.5 |
| Mass of platinum atom per total mass of composition (ppm) | 25 | 25 | 25 | 25 |
| Evaluation on transparency of silicone elastomer | A | B | C | C |

The results shown in Tables 1 and 2 indicate that the perfluoropolyether block-containing organohydrogenpolysiloxane of the present invention has a more excellent solubility in an organopolysiloxane, and the silicone elastomer obtained by reacting and curing the same also has a more excellent transparency, as compared to a conventional organohydrogenpolysiloxane with a small siloxane content and an organohydrogenpolysiloxane having a perfluoropolyether group(s) at random on its side chains.

The invention claimed is:

1. A perfluoropolyether block-containing organohydrogenpolysiloxane represented by the following formula (1)

$$W2-Q-Rf-Q-(W1-Q-Rf-Q)_g-W2 \quad (1)$$

wherein in the formula (1), Rf is a perfluoropolyether block represented by a formula (2), W1 is independently a divalent organopolysiloxane block represented by a formula (A), W2 is independently a monovalent organopolysiloxane block represented by a formula (B), Q is a divalent linking group that may contain at least one of oxygen atom and nitrogen atom, g is a number of not smaller than 0, the formula (2) being expressed as $$-C_zF_{2z}(OCF_2)_v(OC_2F_4)_w(OC_3F_6)_x(OC_4F_8)_yOC_zF_{2z}- \quad (2)$$

wherein in the formula (2), z is an integer of 1 to 4; v, w, x and y each represent a number of 0 to 200, provided that v+w+x+y=3 to 200; each repeating unit may be linear or branched, there are no restrictions on an arrangement of each repeating unit, and the arrangement may be random or block, the formula (A) being expressed as (A)

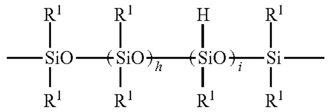

wherein in the formula (A), $R^1$ independently represents an alkyl group having 1 to 4 carbon atoms or a phenyl group; h and i each independently represent a number of 0 to 1,000; there are no restrictions on an arrangement of each repeating unit, and the arrangement may be random or block, and the formula (B) being expressed as (B)

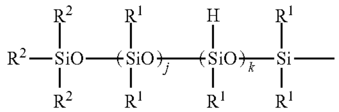

wherein in the formula (B), $R^1$ independently represents an alkyl group having 1 to 4 carbon atoms or a phenyl group; $R^2$ independently represents a hydrogen atom or an aliphatic unsaturated bond-free substituted or unsubstituted monovalent hydrocarbon group having 1 to 18 carbon atoms; j and k each independently represent a number of 0 to 1,000; there are no restrictions on an arrangement of each repeating unit, and the arrangement may be random or block, and wherein the number i of the hydrogensiloxane units in the formula (A) and the number k of the hydrogensiloxane units in the formula (B) shall not both be 0 at the same time; and Q in the formula (1) is bonded to any of the terminal carbon atom of Rf, the terminal silicon atom of W1, or the terminal silicon atom of W2.

2. The perfluoropolyether block-containing organohydrogenpolysiloxane according to claim 1, wherein the organohydrogenpolysiloxane has a number average molecular weight of 2,000 to 500,000, and an organopolysiloxane content of not smaller than 35 weight % per molecule.

3. The perfluoropolyether block-containing organohydrogenpolysiloxane according to claim 1, wherein the perfluoropolyether block represented by Rf is a group expressed by the following formula (10)

$$-CF_2(OCF_2)_v(OC_2F_4)_wOCF_2- \quad (10)$$

wherein in the formula (10), v and w each represent a number of 0 to 200, provided that v+w=3 to 200; the repeating unit of $(OC_2F_4)$ may be linear or branched; there are no restrictions on an arrangement of each repeating unit, and the arrangement may be random or block.

4. A method for producing a perfluoropolyether block-containing organohydrogenpolysiloxane represented by a formula (1), comprising an exchange reaction step of mixing:

(a) a perfluoropolyether-organopolysiloxane block copolymer represented by a formula (11);

(b) an organohydrogenpolysiloxane; and (c) an acid catalyst so as to cause an exchange reaction between the siloxanes of (a) and (b), the formula (11) being expressed as $$W4—Q—Rf—Q—(W3—Q—Rf—Q)_e—W4 \quad (11)$$

wherein in the formula (11), Rf is a perfluoropolyether block represented by a formula (2), W3 is independently a divalent organopolysiloxane block represented by a formula (C), W4 is independently a monovalent organopolysiloxane block represented by a formula (D), Q is a divalent linking group that may contain at least one of oxygen atom and nitrogen atom, e is a number of not smaller than 0, the formula (2) being expressed as $$—C_zF_{2z}(OCF_2)_v(OC_2F_4)_w(OC_3F_6)_x(OC_4F_8)_yOC_zF_{2z}— \quad (2)$$

wherein in the formula (2), z is an integer of 1 to 4; v, w, x and y each represent a number of 0 to 200, provided that v+w+x+y=3 to 200; each repeating unit may be linear or branched, there are no restrictions on an arrangement of each repeating unit, and the arrangement may be random or block, the formula (C) being expressed as (C)

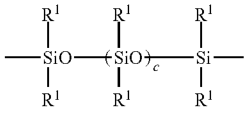

wherein in the formula (C), $R^1$ independently represents an alkyl group having 1 to 4 carbon atoms or a phenyl group; c independently represents a number of 0 to 1,000, and the formula (D) being expressed as (D)

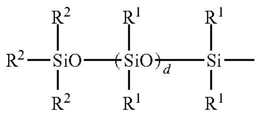

wherein in the formula (D), $R^1$ independently represents an alkyl group having 1 to 4 carbon atoms or a phenyl group; $R^2$ independently represents a hydrogen atom or an aliphatic unsaturated bond-free substituted or unsubstituted monovalent hydrocarbon group having 1 to 18 carbon atoms; d independently represents a number of 0 to 1,000, and wherein Q in the formula (11) is bonded to any of the terminal carbon atom of Rf, the terminal silicon atom of W3, or the terminal silicon atom of W4, the formula (1) being expressed as $$W2—Q—Rf—Q—(W1—Q—Rf—Q)_g—W2 \quad (1)$$

wherein in the formula (1), Rf is a perfluoropolyether block represented by a formula (2), W1 is independently a divalent organopolysiloxane block represented by a formula (A), W2 is independently a monovalent organopolysiloxane block represented by a formula (B), Q is a divalent linking group that may contain at least one of oxygen atom and nitrogen atom, g is a number of not smaller than 0, the formula (2) being expressed as $$—C_zF_{2z}(OCF_2)_v(OC_2F_4)_w(OC_3F_6)_x(OC_4F_8)_yOC_zF_{2z}— \quad (2)$$

wherein in the formula (2), z is an integer of 1 to 4; v, w, x and y each represent a number of 0 to 200, provided that v+w+x+y=3 to 200; each repeating unit may be linear or branched, there are no restrictions on an arrangement of each repeating unit, and the arrangement may be random or block, the formula (A) being expressed as (A)

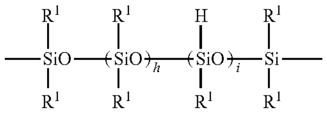

wherein in the formula (A), $R^1$ independently represents an alkyl group having 1 to 4 carbon atoms or a phenyl group; h and i each independently represent a number of 0 to 1,000; there are no restrictions on an arrangement of each repeating unit, and the arrangement may be random or block, and the formula (B) being expressed as (B)

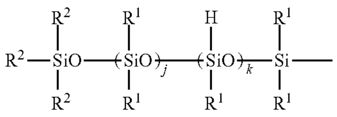

wherein in the formula (B), $R^1$ independently represents an alkyl group having 1 to 4 carbon atoms or a phenyl group; $R^2$ independently represents a hydrogen atom or an aliphatic unsaturated bond-free substituted or unsubstituted monovalent hydrocarbon group having 1 to 18 carbon atoms; j and k each independently represent a number of 0 to 1,000; there are no restrictions on an arrangement of each repeating unit, and the arrangement may be random or block, and wherein the number i of the hydrogensiloxane units in the formula (A) and the number k of the hydrogensiloxane units in the formula (B) shall not both be 0 at the same time; and Q in the formula (1) is bonded to any of the terminal carbon atom of Rf, the terminal silicon atom of W1, or the terminal silicon atom of W2.

5. The method for producing the perfluoropolyether block-containing organohydrogenpolysiloxane according to claim 4, wherein the component (b) is at least one selected from 1,3,5,7-tetramethylcyclotetrasiloxane and 1,3,5,7,9-pentamethylcyclopentasiloxane.

6. The method for producing the perfluoropolyether block-containing organohydrogenpolysiloxane according to claim 4, wherein e is 0 in the formula (11).

7. The method for producing the perfluoropolyether block-containing organohydrogenpolysiloxane according to claim 4, wherein the exchange reaction step is performed by further adding (d) an organohydrogensiloxy unit-free organopolysiloxane to the components (a), (b) and (c), and is a step of causing an exchange reaction between the siloxanes of (a), (b) and (d).

8. The method for producing the perfluoropolyether block-containing organohydrogenpolysiloxane according to claim 4, wherein the acid catalyst (c) is at least one selected from sulfuric acid, methanesulfonic acid and trifluoromethanesulfonic acid.

* * * * *